Patented Apr. 21, 1953

2,636,040

UNITED STATES PATENT OFFICE 2,636,040

METHOD OF PREPARING GLYCIDOL

Herman A. Bruson, Shaker Heights, and Thomas W. Riener, Rocky River, Ohio, assignors to Industrial Rayon Corporation, Cleveland, Ohio, a corporation of Delaware No Drawing. Application October 6, 1950, Serial No. 188,878

8 Claims. (Cl. 260—348)

This invention is concerned with a method for preparing glycidol having the formula:

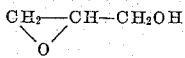

In accordance with the present invention, it has been found that glycidol may be prepared by heating a mixture of glycerol and a cyclic alkylene carbonate. The cyclic alkylene carbonates which may be used for the purpose of this invention are ethylene carbonate, propylene carbonate, and 1,2- or 2,3-butylene carbonate having the general formula:

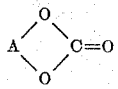

wherein A is an alkylene group. The lower carbon atom members of the cyclic alkylene carbonate series are preferred, particularly, ethylene carbonate.

The reaction may be carried out within a wide range of temperatures, with the more desirable reaction temperatures being between about 125° and 260° C. The reaction may be conducted at ordinary atmospheric pressure, if desired, however, particular advantages are derived at subatmospheric pressures, e. g., temperatures and pressures corresponding to those described in the example.

The reaction which occurs in the preparation of glycidol by the method of the applicants' invention, may be formulated in its simplest form as follows:

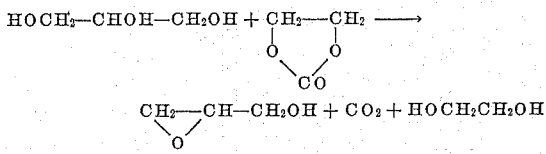

However, it is believed that the reaction may take place in two steps—first, the formation of a complex carbonate and an alkylene glycol, and secondly, the "break-down" of the complex carbonate to liberate carbon dioxide. Preferably, the alkylene glycol which is formed as a byproduct of the reaction is removed as it is formed so as to facilitate decarboxylation of the remaining reaction products. The glycidol formed may be separated from the remaining products by vacuum distillation.

In practicing the method of the applicants' invention, an excess, e. g., up to about 50% excess, of either the glycerol or the cyclic alkylene carbonate may be used if desired. However, especially advantageous results such as higher yields, etc., are obtained when substantially equimolecular proportions of the reacting components are employed.

This invention will be more fully described by the following example, although it is understood that the invention is not intended to be limited by this example. In this example the "parts" and "percent" of materials are parts and percent by weight.

*Example*

A mixture of 92 parts glycerol and 95 parts ethylene carbonate is gradually heated in a vacuum still having a fractionating column. The heating is adjusted so that during the course of the first 1½ hours, the pot temperature reaches about 145° C. under a vacuum of 75 mm. of mercury; then, during the next 1¼ hours, the pot temperature is maintained at between about 135° and 155° C. under 35 mm. vacuum; and finally during 1½ hours at between about 155° and 240° C. under 10–15 mm. vacuum. In the early stages of the heating, ethylene glycol (62 parts) is permitted to distill over into the receiver until the vapor temperature at 11 mm. reaches about 80° C. The thick liquid still pot residue upon further heating in vacuum (5 to 10 mm.) gradually decomposes evolving carbon dioxide and glycidol, the glycidol distilling over below about 60° C. (vapor temperature) at 5 mm. as a colorless liquid. The yield of crude glycidol thus obtained is 64 parts or 86% of the theoretical. Upon redistillation it distills over at about 53–55° C. (10 mm.) The yield of pure redistilled glycidol is 47 parts or 63.5% of theory.

We claim:

1. A method for preparing glycidol which comprises heating a mixture comprising substantially equimolecular proportions of glycerol and a cyclic alkylene carbonate selected from the group consisting of ethylene carbonate, propylene carbonate, 1,2-butylene carbonate and 2,3-butylene carbonate.

2. A method for preparing glycidol which comprises heating at a subatmospheric pressure, a mixture comprising substantially equimolecular proportions of glycerol and a cyclic alkylene carbonate selected from the group consisting of ethylene carbonate, propylene carbonate, 1,2-butylene carbonate and 2,3-butylene carbonate; forming an alkylene glycol; and heating at a subatmospheric pressure, the reaction mixture to liberate carbon dioxide.

3. A method for preparing glycidol which comprises heating at a subatmospheric pressure, a mixture comprising substantially equimolecular proportions of glycerol and a cyclic alkylene carbonate selected from the group consisting of ethylene carbonate, propylene carbonate, 1,2-butylene carbonate and 2,3-butylene carbonate; forming an alkylene glycol; removing said alkylene glycol from the reaction mixture; and heating at a subatmospheric pressure, the reaction mixture to liberate carbon dioxide.

4. A method for preparing glycidol which comprises heating a mixture comprising substantially equimolecular proportions of glycerol and ethylene carbonate; forming ethylene glycol; and heating the reaction mixture to liberate carbon dioxide.

5. A method for preparing glycidol which comprises heating at a subatmospheric pressure, a mixture comprising substantially equimolecular proportions of glycerol and ethylene carbonate; forming ethylene glycol; and heating at a subatmospheric pressure, the reaction mixture to liberate carbon dioxide.

6. A method for preparing glycidol which comprises heating at a subatmospheric pressure, a mixture comprising substantially equimolecular proportions of glycerol and ethylene carbonate; forming ethylene glycol; removing said ethylene glycol from the reaction mixture; and heating at a subatmospheric pressure, the remaining product to liberate carbon dioxide.

7. A method for preparing glycidol which comprises heating at a subatmospheric pressure, a mixture comprising substantially equimolecular proportions of glycerol and ethylene carbonate; forming ethylene glycol; removing said ethylene glycol from the reaction mixture by distillation; heating at a subatmospheric pressure, the remaining product to liberate carbon dioxide; and thereafter distilling glycidol from said mixture.

8. A method for preparing glycidol which comprises heating at a subatmospheric pressure, a mixture comprising substantially equimolecular proportions of glycerol and ethylene carbonate; forming ethylene glycol; removing said ethylene glycol from the reaction mixture by distillation at a subatmospheric pressure; heating at a subatmospheric pressure, the remaining product to liberate carbon dioxide; and thereafter distilling glycidol from said mixture.

HERMAN A. BRUSON.
THOMAS W. RIENER.

References Cited in the file of this patent
UNITED STATES PATENTS

| Number | Name | Date |
| --- | --- | --- |
| 2,446,145 | Strain | July 27, 1948 |